Figure 7:
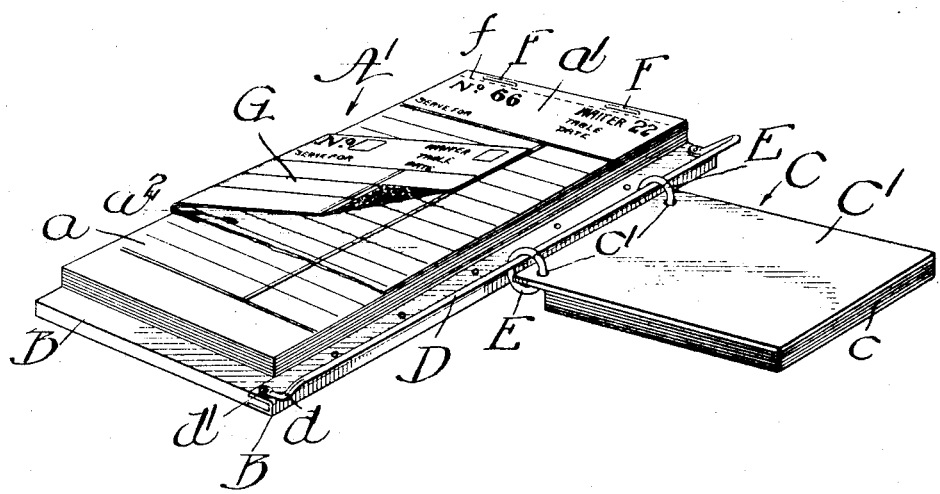

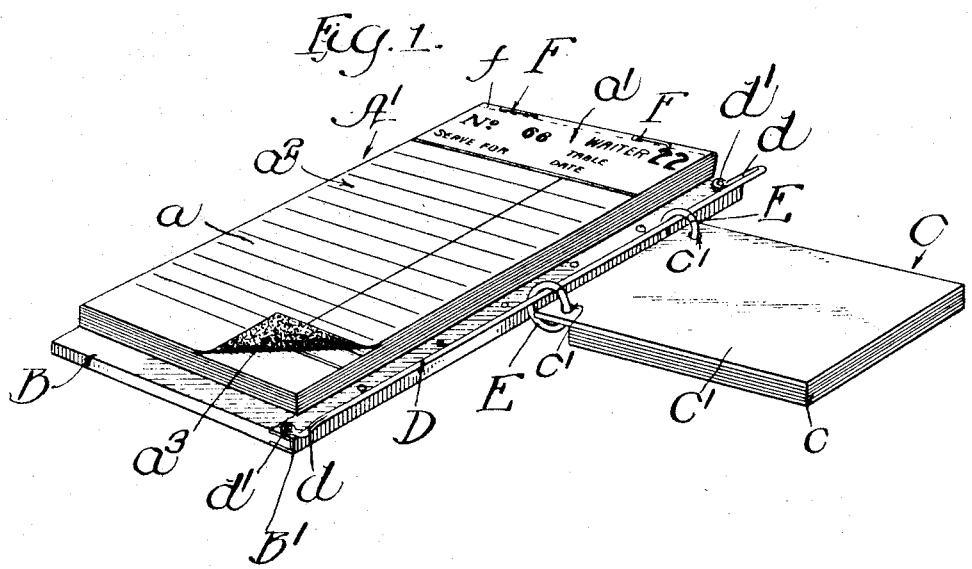
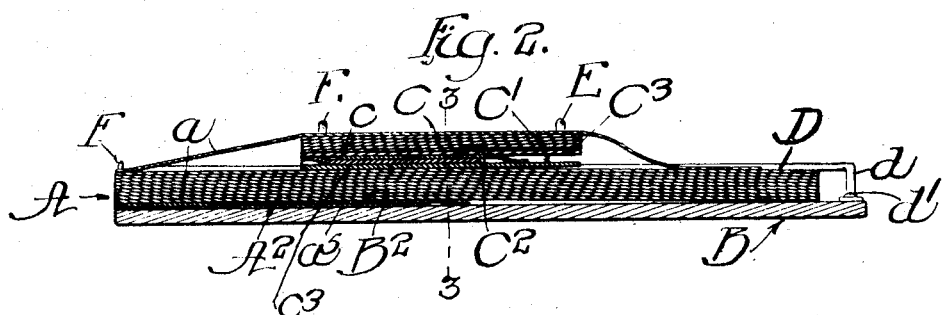
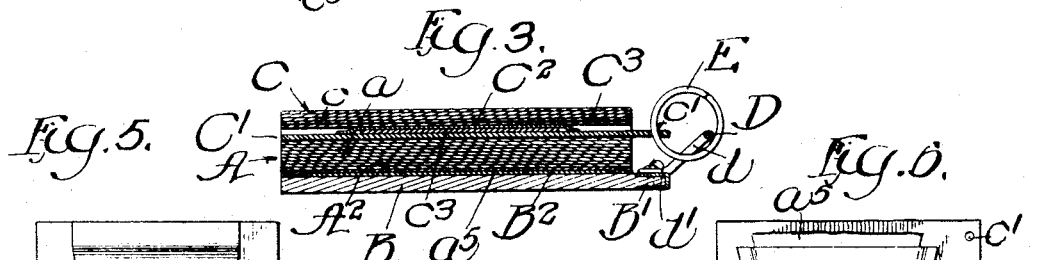
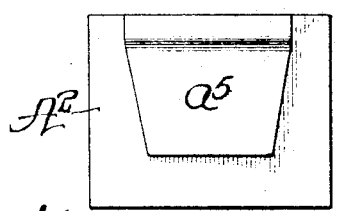
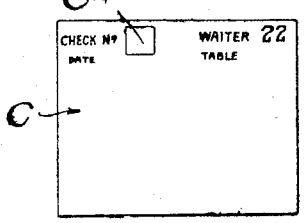
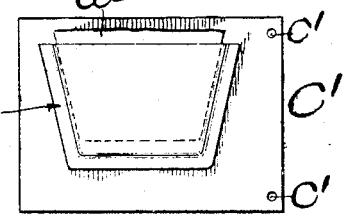

E. Z. LEWIS.
MANIFOLDING SALES CHECK DEVICE.
APPLICATION FILED MAR. 11, 1908.

929,959.

Patented Aug. 3, 1909.
2 SHEETS—SHEET 2.

Witnesses:
F. H. Alfredo
G. R. Wilkins

Inventor
Edward Zuver Lewis
by Poole & Brown
Attys

UNITED STATES PATENT OFFICE.

EDWARD ZUVER LEWIS, OF FRANKLIN, PENNSYLVANIA, ASSIGNOR TO THE GENERAL MANIFOLD AND PRINTING COMPANY, OF FRANKLIN, PENNSYLVANIA, A CORPORATION OF PENNSYLVANIA.

MANIFOLDING SALES-CHECK DEVICE.

No. 929,959.     Specification of Letters Patent.     Patented Aug. 3, 1909.

Application filed March 11, 1908. Serial No. 420,309.

*To all whom it may concern:*

Be it known that I, EDWARD ZUVER LEWIS, a citizen of the United States, and a resident of Franklin, in the county of Venango and State of Pennsylvania, have invented certain new and useful Improvements in Manifolding Sales-Check Devices; and I do hereby declare that the following is a full, clear, and exact description thereof, reference being had to the accompanying drawings, and to the letters of reference marked thereon, which form a part of this specification.

This invention relates to improvements in manifolding sales check devices, such as are used in restaurants and like establishments where foods and refreshments are dispensed, and the invention refers more specifically to a novel holder designed for use in connection with a group or book of customers' or sales checks on which the various items of the orders are entered, and which are presented to the cashier when payment for said orders are made, and to a book or group of check slips upon which the different items of the orders, obtained from various departments or stations of the establishment, are entered at the same time said items are entered on the customer's check; said check slips being detached by the waiter and delivered to the persons at the different departments or stations whose duty it is to fill the orders or to check the same at the time said orders are filled.

The invention consists in the matters hereinafter set forth and more particularly pointed out in the appended claims.

A sales check device embodying my invention embraces a holder for a book or group of customers' checks and a holder for a book or group of check slips which is permanently connected with the customer's check holder in such manner that said check slips may be placed or inserted beneath a customer's check when the items of an order are to be entered or written on the latter, whereby the said items, at the time they are entered on the customer's check, may be transferred, through the means of a transfer medium, as one or more carbon surfaces, to one or a number of check slips beneath the same; the items of the order to be obtained from different stations or departments being entered on separate check slips, and all the items of an order being entered *seriatim* on the customer's check. When an additional order is given by the customer after the first order is filled or partially filled, it is entered on the customer's check and on a still further check slip placed or inserted beneath said check, said slip being thereafter delivered to the proper order filling station when the latter item of the order is filled. The said customer's checks are retained in the book until the last item of the order is filled so that all the items of an order, given at different times, appear on the check, while such items appear on a number of different order slips which have been delivered to the different order filling stations.

Among the objects of my invention is to provide a simple and convenient device by which a book or group of check slips for the purpose specified may be permanently maintained in such relation to a book or group of customers' checks that the various items of an order entered or written on a customer's check at any time may be conveniently transferred to one of the check slips; the holder or support for the order slips being so connected with the holder or support for the customers' checks that said slips are always conveniently at hand and may be readily interleaved or inserted beneath the customer's checks in position to receive a carbon or transfer impression at the time the items are written or entered on a superposed customer's check.

Figure 8:
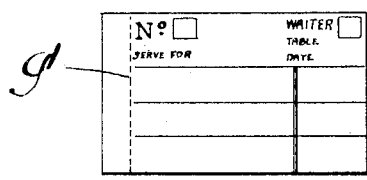
Figure 9:
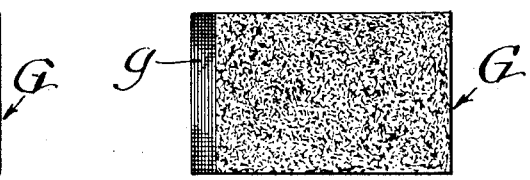

In the drawings:—Figure 1 is a perspective view of a sales check device made in accordance with my invention. Fig. 2 is a longitudinal section of the device showing the order slips in the position which they occupy when an order is to be entered on a customer's check. Fig. 3 is a transverse section taken on line 3—3 of Fig. 2. Fig. 4 is a plan view of one of the check slips. Fig. 5 is a bottom plan view of the check slip holder. Fig. 6 is a view of the base or foundation of a group or book of check slips, illustrating the means of removably mounting a book of check slips on the holder. Fig. 7 is a perspective view of my device as shown in Fig. 1 with an auxiliary check added thereto. Fig. 8 is a face view of the additional or auxiliary check, and Fig. 9 is a view of the under side of said auxiliary check.

In said drawings, A designates a book or group of customers' checks composed of a plurality of superposed leaves *a* removably bound together at their end margins, and B designates a holder for said book to which the book is attached in any suitable manner. The checks $a$ shown are of familiar form, each being divided on its face into two sections $a^1$, $a^2$, the former constituting a heading on which may be entered the number of the check, the number of the waiter and other desired memoranda, and the latter of which is transversely and longitudinally ruled to provide transverse spaces for the several items of the order and at the right-hand side thereof a vertical column to receive the prices set opposite to the items.

C designates a book or group of check slips composed of a plurality of leaves $c$ which are bound together at one end margin, and $C^1$ designates a holder therefor arranged at one side of the holder B. The said holder $C^1$ is hinged to the holder B in such manner that it may be laterally swung over the book of checks $a$ on the holder B so as to bring the uppermost check slip beneath one of the customer's checks, as shown in Figs. 2 and 3. The hinged connection between said holders is made as follows: D designates a straight rod which is arranged parallel with one lateral margin of the holder B and is attached at its ends to said holder, the ends $d$ of the rod being turned inwardly and attached to the holder by means of nails or rivets $d^1$. E, E designate rings which encircle the rod D and extend through openings $c^1$ in the margin of the holder $C^1$ adjacent to the holder B. The said rings are made of a diameter to permit such freedom of movement of the holder $C^1$, with respect to the rod D, that said holder $C^1$ may rest flat on the book of customers' checks notwithstanding the varying thickness of said book. The holders B and $C^1$ may be made of relatively heavy paperboard, in which event it is desirable to reinforce or stiffen the margin of the holder B to which the hinge rod D is attached. For this purpose said margin is shown as provided with a metal reinforcing strip $B^1$, herein shown as made of channel form to embrace said margin. The rivets or nails $d^1$, by which said rod is fastened in place, extend through the flanges of said channel reinforcing strip and the margin of the holders. When the holder $C^1$ and the check slips mounted thereon are swung away from the holder B, as shown in Fig. 1, the said holder lies on top of the book of check slips, and when swung inwardly over the holder B and the customers' checks, the said holder $C^1$ lies between the lowermost check slip and the subjacent customer's slip, as shown in Figs. 2 and 3. The said holder $C^1$ is made of relatively thick material and prevents a carbon impression being made on a subjacent customer's check when the last check slip of a book or series C is in position to receive a carbon or transfer copy of an item or items entered on a customer's check.

The carbon or transfer material is in this instance applied to the back or rear faces of the customers' checks, as shown at $a^3$, this arrangement rendering unnecessary the use of separate carbon sheets and greatly facilitating the manipulation of the device. The said check slips and the holder therefor are made shorter than the customers' checks and the holder for the latter, and are adapted to be moved longitudinally of the customer's check holder in order to bring said check slips into position to receive a transferred impression of an item written on any portion of the length of the section $a^2$ of a customer's check. The form of hinge connection shown between said holders B and $C^1$ permits the check slip holder to be moved freely from one end to the other of the customer's check holder for the purpose described.

In arranging the device to enter an order on one of the customer's checks $a$, such check is first folded backwardly and the book of check slips and the support therefor are then swung over the customers' checks into the position shown in Figs. 2 and 3. The customer's check upon which the order is to be entered is thereafter laid over the check slips and the book of check slips is shifted to a position beneath that part of the customer's check on which the order is to be entered. The items of the order are then written in the transverse spaces of the section $a^2$ of the customer's check at which time the prices of the various items may be entered opposite thereto in the vertical column at the right-hand side of said check. By reason of the interposition of the transfer material between the upper customer's check and the upper check slip the entry of the order so made is simultaneously made on the check slip below. Usually the principal part of the order, such as the items which are to be obtained from the kitchen, will be first entered at the upper part of the section $a^2$ of the customer's check and the check slips are made of sufficient length to contain a number of items embraced in an order of usual size. Items embraced in the same order and which are filled at another station as, for instance, at the bar or cigar counter, may be entered at the same or a later time. When entered at the same time said items will be transferred to another check slip or slips, the check slip which received the previous transfer being swung to one side, after the customer's check has been swung backwardly, to present the next lower check slip in position to receive the transferred impression of the next entry, the book of check slips and support therefor being in the meantime shifted downwardly to the next position of entry on the customer's check. In this manner any number of different items of an order to be filled at different stations may be entered on the customer's check and each item or group of items transferred to its proper check slip. Moreover, several different orders may be entered on as many different customers' checks by a waiter serving a number of different patrons at one time, and the items of each order to be filled at different stations transferred to different check slips which are thereafter removed or detached from the book C. The check slips bear the number of the waiter to correspond with the number on the customer's check and are provided with spaces $c$ to receive the serial numbers of said customers' checks. After the order has been entered in the manner described, the check slips are detached and are deposited at the stations at which the items of the order which they bear are filled, and the customer's check remains attached to the book A. When the order is completed the customer's check is footed and delivered to the customer, to be handed to the cashier when the check is paid. If a second or third item or group of items is to be added to an order, the book of check slips is again inserted beneath the customer's check to receive the carbon impression of the added item or items, and the new check slip is deposited at the station at which said item or items of the order is filled.

It will thus be seen that an order made up of a number of items to be filled at different stations may be entered *seriatim* on the customer's check and that each item or group of items of the order to be filled at different stations will be transferred to check slips which are delivered to the proper stations. Thus the proprietor of an establishment is enabled to check the items furnished to patrons from different stations or departments, and by comparing the several items on the customers' checks with the several check slips he may ascertain if all the items on the check slips have been properly entered on the customer's check and paid for by the customer. It will also be manifest that the device herein shown and described affords an exceedingly simple and effective means for interleaving the check slips with the customers' checks and keeping the slips together until the proper time to deposit them at the order filling stations at the times the orders are filled. Thus liability of the waiters losing the check slips after they are made out, or otherwise committing errors is greatly lessened. The said customer's check book and the check slip book may be attached to the holders B and $C^1$ in any suitable or preferred manner. It is desirable, however, that means be provided for detachably fixing the books to said holders, whereby, when a book of either kind is exhausted it may be readily placed on the holder. A simple and effective means for thus fastening the customer's check book and check slip book to their holders consists in providing the holders B and $C^1$ with pockets $B^2$ and $C^2$, respectively, and mounting the leaves of said books on relatively heavy backings $A^2$ and $C^3$, respectively, provided with tongues $a^5$ and $c^3$, respectively, which enter said pocket, in the manner most clearly shown in Figs. 2, 3, 5 and 6. The end margins of the leaves $a$ are shown as bound together by a common form of wire staples or fasteners F and the leaves $a$ may be separately removed by being severed from said bound edges along the weakened or perforated line $f$ (Fig. 1). Any other suitable method of removably securing together the leaves $a$ may of course be used.

In Figs. 7, 8 and 9 of the drawings is shown an additional or auxiliary check sheet G, intended for use in connection with the sales check devices hereinbefore described in case the orders given by a customer are so many that they cannot be written on one of the main leaves or checks $a$ of the device. Such auxiliary sheet G will have on its rear face a coating of transfer material, and will be provided also on its rear surface at one lateral edge thereof, with adhesive material or gum, as indicated at $g$, Fig. 9, by which it may be attached to the uppermost or exposed leaf $a$ of the book of checks. Said auxiliary sheet will have applied to it, or written thereon, a number corresponding with that printed on the several leaves $a$, $a$ of the book. Preferably the gummed edge of the said auxiliary leaf will be secured to the lower surface of the leaf $a$ at the left hand edge of the latter, and the body of the auxiliary leaf will be folded along the dotted line $g^1$ (Fig. 8) over or against said sheet $a$, as shown in Fig. 7. Preferably, also the auxiliary sheet will be made of the same width as, but shorter than, the main leaf $a$. The auxiliary sheet G will be used in connection with the check slips $c$ of the book C, in the same manner as in the case of the main leaves $a$. That is to say, assuming that the leaf or check $a$ has been filled by items written thereon, and the customer gives another order, the waiter will secure an auxiliary sheet G to the leaf $a$, in the manner described, then swing the holder B with the check slips over upon the sheet $a$, and between the latter and the attached auxiliary sheet. The item or items constituting the order will then be written on the auxiliary sheet, and transferred to the check slip beneath it. The check slip is then detached from the book C and used by the waiter to obtain the desired articles from the proper department. The auxiliary sheet will remain attached to the customer's check, and the cost of the items thereon will be added to those entered on the main check, before the check is handed to the customer.

I make no claim herein to the sales check provided with a transferring composition on its rear surface and also gummed on its said rear surface along one of its lateral edges: as herein illustrated and described, but reserve the right to claim the same in another application.

I claim as my invention:—

1. A sales check device comprising a book of customers' checks, a holder therefor with means for detachably fixing said book thereto, a book of check slips, a holder therefor provided with means for detachably fixing said book of slips thereto, and a hinge connection between said holders arranged to permit the check slip holder to swing laterally over the customer's check holder and also to slide longitudinally thereof.

2. A sales check device comprising a book of customers' checks, a holder therefor, a book of check slips and a holder therefor, and a hinge connection between said holders comprising a hinge rod arranged parallel with one margin of the customer's check holder and attached at its ends thereto and rings attached to said check slip holder and embracing said rod.

3. A sales check device comprising a book of customers' checks and a holder therefor, a book of check slips and a holder therefor, and a hinge connection between said holders comprising a hinge rod arranged parallel with one margin of the customer's check holder and attached at its ends thereto and rings attached to said check slip holder and embracing said rod, said customer's check holder being provided at its margin adjacent to said hinged connections with a reinforcing strip and said hinged rod being attached to said holder by fastening devices extending through said reinforcing strip.

In testimony, that I claim the foregoing as my invention I affix my signature in the presence of two witnesses, this 21st day of February A. D. 1908.

EDWARD ZUVER LEWIS.

Witnesses:
TAYLOR C. BROWN,
GEORGE R. WILKINS.